Nov. 27, 1934.    A. H. MITTAG    1,982,350
CONTROL SYSTEM
Filed Aug. 25, 1933    2 Sheets-Sheet 2

Inventor:
Albert H. Mittag,
by Harry E. Dunham
His Attorney.

Patented Nov. 27, 1934

1,982,350

UNITED STATES PATENT OFFICE 1,982,350

CONTROL SYSTEM

Albert H. Mittag, Schenectady, N. Y., assignor to General Electric Company, a corporation of New York Application August 25, 1933, Serial No. 686,750

12 Claims. (Cl. 172—239)

This invention relates to control systems, more particularly to follow-up control systems and the like and it has for an object the provision of a simple, reliable and improved system of this character.

More specifically, the invention relates to follow-up systems in which the driving means for the driven member of the system is controlled by means of devices which cause the driving means to operate in the wrong direction if the positional disagreement of the pilot device and driven object exceeds a predetermined amount. For example, the driving means may be controlled by rotary induction devices associated with the pilot device and driven object. If the pilot device and driven object become out of correspondence in excess of a predetermined amount, for example, an amount corresponding to 180 electrical degrees of the induction devices, the control of these devices is reversed and the driving means operated to drive the driven object further out of correspondence instead of toward the position of correspondence as is desired. This condition frequently arises if the pilot device or director is moved out of correspondence with the following or driven object in excess of this predetermined amount when the power is turned off. Consequently when the power is restored, the control functions to cause the driving means to drive the following or driven object still further out of correspondence with the pilot or controlling device.

In carrying the invention into effect in one form thereof, the driving means is under the control of means responsive to positional disagreement of the pilot device and driven object. Means are provided for temporarily rendering the positional disagreement responsive means inactive if the disagreement exceeds a predetermined amount and for causing the driving means to reverse and drive the driven member in the correct direction, together with means for restoring the control to the regular disagreement responsive means when the positional disagreement becomes less than the previously mentioned predetermined amount.

In illustrating the invention in one form thereof, it is shown as embodied in a follow-up control system in which a gun is caused to follow the motion of a directing telescope and in which the movement of the telescope is limited to a predetermined portion of an entire revolution.

Figure 1:
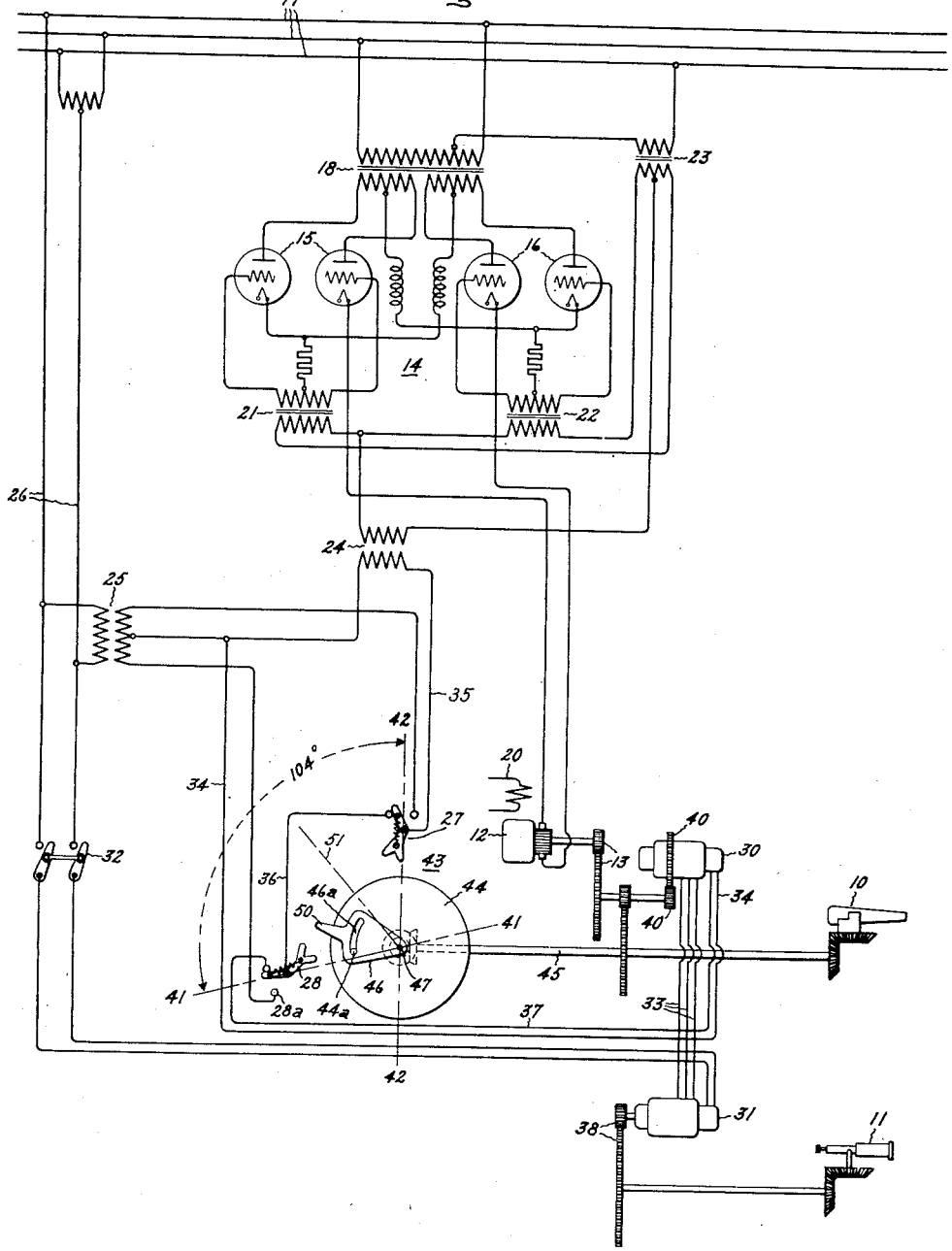
Figure 2:
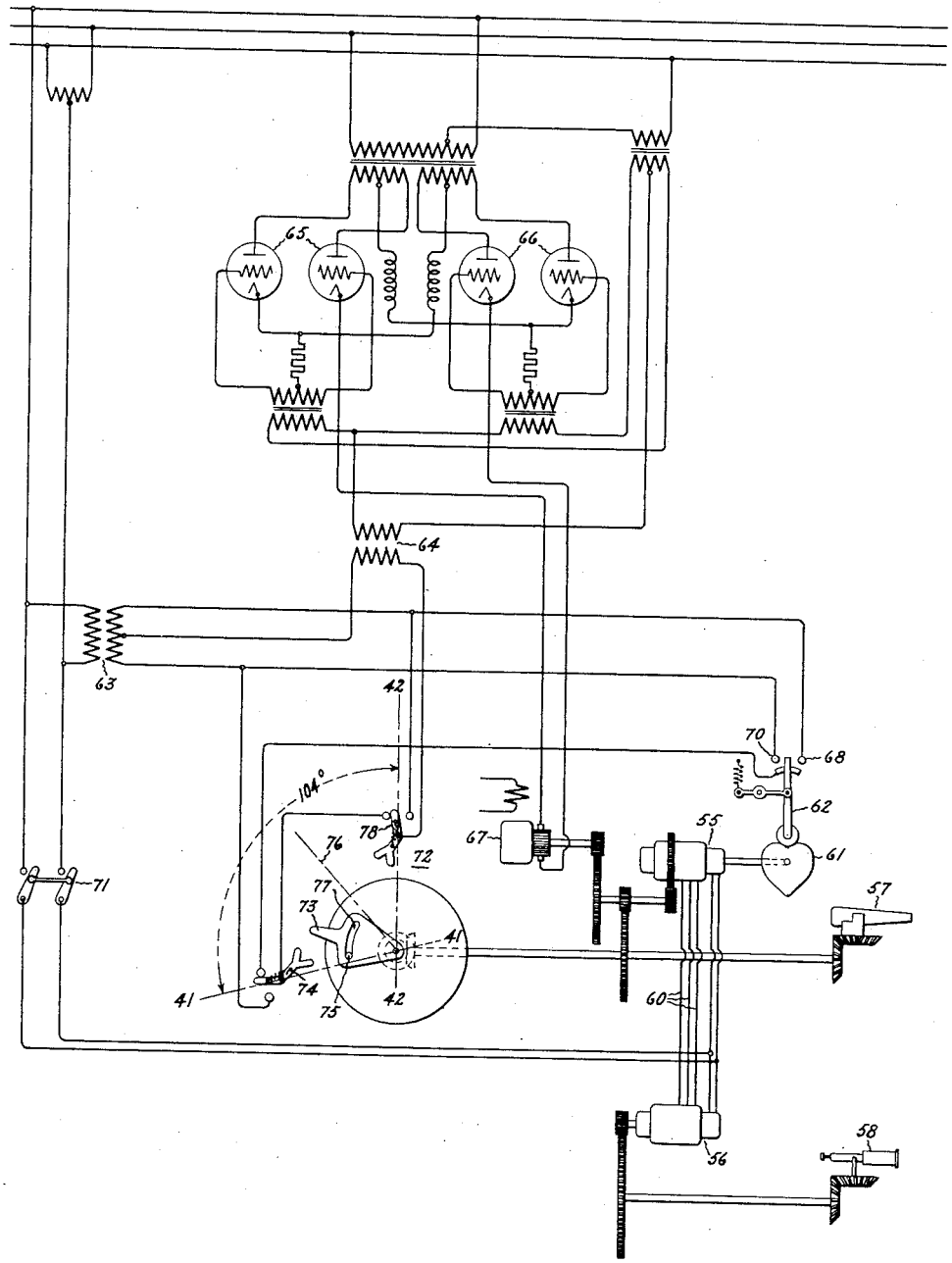

For a better and more complete understanding of the invention, reference should now be had to the following specification and to the accompanying drawings in which Fig. 1 is a simple diagrammatical representation of an embodiment of the invention as applied to controlling the movement of a gun and Fig. 2 is a simple diagrammatic representation of a modification.

Referring now to the drawings, a relatively heavy object, such for example as a naval gun 10 is rotated either in train or in elevation with a control or pilot device represented by the telescope 11. In the drawing, the invention is shown as embodied in a system for controlling the movement of the gun in train but it will, of course, be understood that it is equally applicable to controlling the movement in elevation and is generally applicable to systems in which the movement of a driven member is caused to follow the movement of a pilot device. The gun 10 is driven by any suitable driving means, such for example, as direct current electric motor 12, to the drive shaft of which the gun mounting platform is connected by means of suitable reduction gearing 13. Direct current is supplied to the armature of this motor by suitable means such for example as the electric valve apparatus 14 illustrated as comprising a pair of valves 15 for supplying direct current in one direction to the armature of the motor 12 and a second pair of electric valves 16 for supplying current to the armature in the reverse direction. The electric valve apparatus is in turn supplied from a suitable source of alternating voltage, represented by the three supply lines 17 through a suitable supply transformer 18, the primary winding of which is connected to the upper and middle supply lines 17 and the secondary windings of which are connected to the anodes of the electric valve apparatus in the manner illustrated. The direct current motor 12 is provided with a separately excited field winding 20 which is supplied from any suitable separate source of direct current.

Although the electric valves may be of any suitable type, they are preferably of the three-electrode vapor electric type, that is to say that after exhaust a small quantity of an inert gas such for example as mercury vapor is introduced into the envelope and the presence of this mercury vapor within the valves serves to change the usual electronic discharge into an arc stream thereby constituting the valves grid controlled arc rectifiers. As is well understood by persons skilled in the art, the average value of the current flowing in the anode circuit of electric valves of this character can be varied by varying the phase relationship between the voltages applied to the grids and to the anodes respectively. When the grid voltage is substantially in phase with the anode voltage, the current flowing in the anode circuit is maximum and when the grid voltage is 90° or more lagging with respect to the anode voltage, the current flowing in the anode circuit is substantially zero. For intermediate phase relationships, the current flowing in the anode circuit has corresponding intermediate values.

Alternating voltage is supplied to the grids of the pairs of electric valves 15 and 16 by means of grid transformers 21 and 22 respectively, the primary windings of which are connected in series relationship with the secondary winding of a grid biasing transformer 23, one terminal of the primary winding of which is connected to the lower supply line 17 and the opposite terminal of which is connected to an intermediate point of the primary winding of the main supply transformer 18. This intermediate connection serves to bias the grid voltage of the electric valve apparatus approximately to the 90° relationship with respect to the anode voltages so that neither pair of valves 15 or 16 supplies current to the aramature of the motor 12.

For the purpose of varying this phase relationship of the grid and anode voltages so as to effect rotation of the motor in one direction or the other, a component voltage is supplied to the grid circuit by means of a transformer 24, one terminal of the secondary winding of which is connected to a mid-point between the primary windings of the grid transformers 21 and 22 and the opposite terminal of the secondary winding of which is connected to a mid-point of the secondary winding of the bias transformer 23. The component voltage supplied to the grid circuit by means of the transformer 24 is substantially in phase with the anode voltage of one pair of valves and consequently substantially 180° out of phase with the anode voltage of the other pair of valves at any one instance and thus it will be seen that by varying the magnitude of this component voltage from a maximum value that is positive with respect to the anode voltage of one pair of valves to a maximum value that is negative with respect to the anode voltage of the same pair of valves, the phase relationship of the resulting grid voltage, i.e., the vectorial sum of the component voltage and the grid bias voltage may be varied as desired and the magnitude of the current supplied to the electric motor correspondingly varied and reversed. One terminal of the primary winding of the transformer 24 is connected to the mid-point of the secondary winding of a transformer 25, the primary winding of which is connected by means of conductors 26 to the source 17. The opposite terminal of the primary winding of the transformer 24 may be connected with either of the terminals of the secondary winding of the transformer 25 by means of switching devices 27 and 28 respectively. Under normal operating conditions, the switches 27 and 28 occupy the position in which they are illustrated and thus the right hand terminal of the primary winding of the transformer 24 is disconnected from the terminals of the secondary winding of the transformer 25. It will be seen, however, that if the switch 27 is operated to its right hand position, the right hand terminal of the transformer 24 is connected to the upper terminal of the secondary winding of the transformer 25 and consequently the polarity of the component voltage supplied to the grid circuit of the electric valve apparatus is such that one pair of valves is energized and supplies current in one direction to the armature of the motor 12, whereas if the switch 27 remains in the position in which it is illustrated and the switch 28 is operated to its lower position the right hand terminal of the primary winding of the transformer 24 is connected to the lower terminal of the secondary winding of the transformer 25 and the other pair of valves is energized to supply current in the opposite direction to the armature of the motor 12.

As stated above, under normal operating conditions, the switching devices 27 and 28 occupy the positions in which they are illustrated and the right hand terminal of the primary winding of the transformer 24 is disconnected from both terminals of the secondary winding of the transformer 25. Under these conditions the primary winding of the transformer 24 is connected to the source 17 through suitable rotary induction devices 30 and 31 respectively under the control of the driven object 10 and the pilot or control device 11 by means of which the component voltage supplied to the grid circuit of the electric valve apparatus is varied in magnitude in proportion to the positional disagreement of the control device and the driven object.

The rotary induction device 31, usually referred to as the transmitter comprises a rotor member provided with a single phase winding (not shown) and a stator member provided with a distributed three-element winding (not shown) which is physically similar to the three phase winding of the usual polyphase dynamo electric machine. The single phase winding and the distributed three element winding are arranged in inductive relationship with each other and the terminals of the single phase winding are connected to the supply source 17 by means of the conductors 26 with a suitable manually operated switching device 32 included in the connection for interrupting and reestablishing the supply of power from the source to the single phase winding of the device 31. The rotary induction device 30 usually referred to as the receiver, is in all respects identical with the transmitter 31, and the terminals of its distributed three element winding are connected to corresponding terminals of the stator winding of the device 31 by means of conductors 33 whilst its single phase winding is connected to the terminals of the primary winding of the transformer 24 over a circuit that is traced from the right hand terminal of the single phase winding of the device 30 by a conductor 34 to the left hand terminal of the primary winding of the transformer 24 and from the right hand terminal of this winding through conductor 35, switching device 27 (in its left hand position) conductor 36, switching device 28 in its upper position and thence by conductor 37 to the left hand terminal of the single phase winding of the device 30. When the switch 32 is in its closed position, the single phase winding of the transformer 31 is energized and produces an alternating magnetic field by means of which a voltage is induced in the three element stator winding thereby causing a current to flow in the stator windings of the receiver 30, and in turn producing an alternating magnetic field by means of which a voltage is induced in the single phase winding of the rotor member of the receiver. When the axis of the single phase winding of the receiver 30 is at right angles with the axis of the magnetic field produced by the stator winding no voltage is induced in the single phase winding, but when the axis of this winding is substantially parallel with the axis of the magnetic field of the stator winding, a maximum voltage is induced in the single phase winding and applied to the grid circuit of the electric valve apparatus.

The rotor member of the transmitter 31 is connected through suitable multiplying gearing 38 with the pilot device 11 so that rotation of the latter effects a rotation of the rotor of the transmitter. Similarly the rotor member of the receiver 30 is connected to the driving shaft of the driven member 10 through multiplying gearing 40 having the same ratio as the gearing 38. Rotation of the rotor member of the transmitter causes the axis of its magnetic field to rotate in space and similarly to produce a rotation in space of the magnetic field produced by the stator winding of the receiver 30. Thus a rotation of the rotor member of the transmitter 31 effects a variation in the magnitude of the voltage supplied to the grid circuit of the electric valve apparatus. It will also be clear that if the rotation of the rotor member of the transmitter 31 is in one direction the component voltage supplied to the grid circuit of the electric valve apparatus will have a given instantaneous polarity with respect to the anode voltage of the electric valve and will thus energize one of the pairs of valves and cause it to supply current to the motor 12 whereas if the rotation of the rotor member of the transmitter 31 is in the opposite direction the voltage supplied to the grid circuit of the electric valve will have an instantaneous polarity that is 180° out of phase from the voltage supplied under the first condition and thus the opposite pair of valves will be energized and caused to supply current to the motor in a direction to effect rotation in the reverse direction.

As is usually the case, the movement of the gun 10 must be restricted to a predetermined portion of a circle. In the particular problem chosen to illustrate the invention the movement of the gun is limited to an angle of 104°. This angle is indicated by the broken line 41—41 and 42—42. Although the gearing 38 and 40 may have any desired ratio, they are assumed in the problem chosen for illustration to have a ratio of 7:18, that is to say, for a complete rotation of the pilot device 11 or the driven member 10 the rotors of the transmitter and receiver make 2-4/7 complete revolutions or in other words for a rotation of 104° of the pilot device 11, the rotor of the transmitter 31 rotates through 267°. Now if the rotors of the transmitter 31 and the receiver 30 become out of correspondence by more than 180° the instantaneous polarity or phase of the voltage supplied to the grid circuit of the electric valve apparatus becomes out of phase with the voltage previously supplied by 180°, that is to say the phase or polarity of the voltage is reversed. Consequently one pair of valves is energized and the driving motor 12 operates in the wrong direction so that the driven member 10 instead of being driven in a correct direction to cause a position of correspondence with the pilot device 11 is actually driven in the wrong direction and becomes further out of correspondence. Ordinarily, the rotors of the transmitter and receiver do not become as much as 180° out of phase but it will be clear that if the pilot device 11 is rotated when the switch 32 is opened and the power is off, the rotors of the transmitter 31 and receiver 30 may become more than 180° out of correspondence in which case when the power is restored, the driven object 10 will be driven in the wrong direction.

In order to eliminate this undesirable operating characteristic means 43 are provided for automatically taking the control away from the transmitter 31 and receiver 30 if their rotors become more than 180° out of correspondence and for supplying a fixed voltage from the transformer 25 to the grid circuit of the electric valve apparatus and of such polarity as will energize the correct pair of electric valves and thus cause current to be supplied to the motor 12 in such a direction that the driven member 10 is driven in the correct direction into correspondence with the pilot device 11. This means 43 is illustrated as comprising a member 44 connected with the driven member 10 by means of a shaft 45 together with a sector shaped member 46 loosely mounted upon the shaft 47 of the member 44. As shown, the sector shaped member 46 is provided with a slot 46a which is engaged by a pin 44a attached to the member 44. Thus the member 44 serves to drive the member 46 when the pin 44a is in engagement with either end of the slot. The sector-shaped member 46 is provided with an extension 50 which is arranged to engage the switching devices 27 and 28.

With the above understanding of the elements and their organization in the completed system, the operation of the system itself will readily be understood from the following detailed description:

It is assumed that the system is at rest with the switch 32 operated to its open position so that power is removed from the transmitter 31. The driven member 10 occupies a position that is represented by the control member 50 and it is assumed that with the power off the pilot device 11 has been rotated to a position out of correspondence with the driven member 10 such that the rotors of the transmitter 31 and the receiver 30 are more than 180° out of correspondence. Such a position of the pilot device 11 relative to the driven member 10 is represented by the position of the broken line 51 relative to the control member 50. It is further assumed that in order to drive the member 10 into correspondence with the pilot device 11, the pair of valves 15 must be energized to supply current to the motor 12. However, if the switch 32 is operated to its closed position to energize the transmitter 31, the voltage that is supplied from the receiver 30 to the grid circuit of the electric valve apparatus will be 180° out of phase from the phase that it should have to energize the pair of valves 15. This is true because as previously pointed out the rotors of the transmitter 31 and the receiver 30 are more than 180° out of correspondence with each other. Consequently, the component voltage supplied to the grid circuit of the electric valve apparatus will have reverse phase with the result that a pair of valves 16 is energized and supplies current to the motor 12 causing it to operate in the wrong direction and drive the driven member 10 still further out of correspondence with the pilot device 11. If the driven member 10 proceeds in the wrong direction, the member 50 which is driven through the pin and slot connection by the member 44 is driven in a counterclockwise direction toward the switching device 28. This motion continues until the member 50 engages the switching device 28 (which as illustrated is an over-center device) and snaps it from the position in which it is illustrated to its lower position in which it engages the contact member 28a. As the switching device 28 is disengaged from the upper stationary contact the circuit previously traced from the rotor winding of the receiver 30 to the primary winding of the grid transformer 24 is interrupted thereby temporarily rendering the transmitter 31 and the receiver 30 inactive to control the electric valve apparatus. As the switch member 28 engages contact member 28a, a circuit is completed from the lower terminal of the secondary winding of the transformer 25 to the right hand terminal of the primary winding of the grid transformer 24 and the connections established by the switching device 28 are so chosen that the voltage supplied from the transformer 25 to the transformer 24 is of reverse polarity with respect to that previously supplied from the receiver 30 to the transformer 24. Consequently, the grid voltage of the electric valve apparatus is reversed in phase and the pair of valves 16 which were previously active are now rendered inactive whilst the pair of valves 15 which were previously inactive are now rendered active to supply current to the motor in the correct direction so that the driven member 10 is driven in the correct direction into correspondence with the pilot device 11. When this reverse rotation begins, the direction of the member 44 is likewise reversed but the member 46 and its extension 50 remain at rest until the pin attached to the member 44 has traveled the full length of the slot 46a and engages the opposite end of the slot from that which it is illustrated as engaging. It will thus be seen at this point that the member 44, the pin 44a, the member 46 and its slot cooperating with the pin 44a constitute a lost motion device and thus prevent the control being returned to the transmitter 31 and the receiver 30, immediately the direction of the motor has been reversed. However, when the pin 44a has traveled the length of the slot 46a, the member 46 is set in motion in the clockwise direction. The length of the slot 46a however must be so chosen that the member 46 is not set in motion until the driven member 10 and the pilot device 11 are out of correspondence by an amount corresponding to less than 180° out of correspondence of the transmitter 31 and receiver 30. Thus as the reverse direction of the member 46 begins, the extension 50 snaps the switching device 28 from engagement with the contact member 28a to engagement with the upper contact thereby disconnecting the lower terminal of the transformer 25 from the right hand terminal of the transformer 24 and reconnecting the latter terminal with the rotor winding of the receiver 30. Since the rotor of the receiver 30 is now less than 180° out of correspondence with the rotor of the transmitter 31, the phase of the voltage supplied to the grid circuit of the electric valve apparatus is correct and the valves 15 are continued energized and the motor 12 continues to drive the member 10 toward the position of correspondence with the pilot device 11. When the position of correspondence is reached the axis of the winding of the rotor 30 arrives in a position at right angles with the magnetic field set up by the stator winding so that the component voltage supplied to the grid circuit of the electric valve apparatus becomes zero and the electric valve apparatus is rendered non-conducting. As a result the motor 12 is stopped with the member 10 in exact correspondence with the pilot device 11.

It will be understood that if the member 10 had been at rest in a position such that the extension 50 occupies the position of the broken line 51 and with the power off, the pilot device had been rotated to the position in which the extension 50 is illustrated as occupying the operation would have been similar to that already described above with the exception that the member 44 would have been operated in the reverse direction from that previously described until the extension 50 engaged the switching device 27. The engagement of the extension 50 with the switching device 27 would then interrupt the connections from the receiver 30 to the grid transformer 24, and would connect the right hand terminal of the primary winding of the transformer 24 with the upper terminal of the secondary winding of the transformer 25 so that the correct pair of electric valves 16 would be energized to cause the motor 12 to drive the member 10 in the correct direction into correspondence with the pilot device 11. Again as the member 10 became out of correspondence with the device 11 by an amount corresponding to less than 180° between the rotors of the transmitter 31 and the receiver 30, the pin 44a would again engage the lower end of the slot 46a and cause the extension 50 to engage the switching device 27 and retransfer the control of the grid circuit of the electric valve apparatus from the transformer 25 to the transmitting and receiving devices 31 and 30 respectively.

In the modification of Fig. 2, the apparatus and connections are in most respects identical with those described in connection with the system of Fig. 1. It will be observed, however, that the single phase winding of the receiver 55 is connected to the same supply source as that with which the single phase winding of the transmitter 56 is connected. The stator member of the receiver 55 is freely mounted for rotation in ball bearings and is geared to the driven member 57 so as to rotate in accordance with the movement of the member 57. The ratio of the gearing between the stator member of the receiver 55 and the driven member 57 is the same as the ratio of the gearing between the transmitter 56 and the pilot device 58. When the axes of the rotor windings of the transmitter 56 and the receiver 55 are in correspondence with each other, the voltages induced in the stator windings of both devices are equal and opposite with the result that substantially no current flows in the conductors 60 which interconnect corresponding terminals of the stator winding of the transmitter and receiver. If, however, the rotor of the transmitter is rotated with respect to the stator the voltages induced in the stator windings of these devices become unbalanced with the result that current flows from one device to another through the conductors 60 which produces a torque between the rotor and stator members of the receiver tending to rotate the rotor member of the receiver in a direction to restore the position of correspondence between the axes of the rotor members of both devices and also to restore the balanced condition between the voltages induced in the stator windings of both devices. A heart-shaped cam member 61 is mounted on the shaft of the rotor of the receiver 55 and engages with the cam follower of a switching device 62 so as to operate the contact arm of the latter from its central or neutral position to engage the right or left-hand co-operating stationary contact, depending upon the direction of rotation of the cam member 61. When the movable contact of the switching device 62 is in engagement with either stationary contact one or the other of the terminals of the transformer 63 is connected to the right hand terminal of the primary winding of the grid transformer 64. One or the other of the pairs of electric valves 65 or 66 will be energized to supply current to the driving motor 67.

If the pilot device is moved out of correspondence with the driven member 57 in a clockwise direction the cam member 61 is rotated in such a direction that the switching device 62 is actuated into engagement with the stationary contact 68, thereby connecting the upper terminal of the secondary winding of the transformer 63 with the right hand terminal of the primary winding of the grid transformer 64 and the polarity of the voltage thus applied to the grid circuit of the electric valve apparatus is such as to energize the pair of valves 65 whereby current is supplied to the motor 67 in such a direction that the latter drives the driven member 57 toward the position of correspondence with the pilot device 58. Similarly if the pilot device 58 is moved out of correspondence in a counterclockwise direction, the receiver 55 actuates the cam member 61 in a clockwise direction so that the contact member 62 is actuated into engagement with the stationary contact member 70. As a result, the right-hand terminal of the primary winding of the grid transformer 64 is connected to the lower terminal of the secondary winding of the transformer 63 and the polarity of the voltage thus applied to the grid circuit of the electric valve apparatus is such that the pair of valves 66 is energized and current is supplied to the motor 67 in such a direction that the driven member 57 is driven into a position of correspondence with the pilot device 58.

Now it will be seen that if while the switch 71 is opened and power is removed from the transmitter 56 and receiver 55, the pilot device 58 should be moved out of correspondence with the driven member 57 by an amount such that the rotors of the transmitter 56 and receiver 55 become out of correspondence by more than 180° and the contact member 62 is actuated into engagement with the incorrect stationary contact member 68 or 70. Consequently, the voltage applied to the grid circuit of the electric valve apparatus will have the wrong polarity and the wrong pair of valves will be energized and will supply current to the motor 67 in a direction such that the driven member 57 is driven still further out of correspondence with the pilot device 58. In order to overcome this undesirable operation, means 72 are provided which are in all respects identical with the means 43 of Fig. 1 and for this reason, the detailed description of these means in connection with Fig. 1 will not be repeated.

The operation is as follows:

If the pilot device and the driven member occupy relative positions as indicated by the broken line 76 and the extension 73 such that the rotors of the transmitter and receiver are more than 180° out of correspondence, when the switch 71 is closed to restore power to the rotor windings of the transmitter and receiver, the cam 61 actuates the contact member 62 into engagement with the contact 68 whereas the contact member 62 should be in engagement with the contact member 70. As a result, the upper terminal of the transformer 63 is connected to the right hand terminal of the transformer 64 and the polarity of the voltage applied to the grid circuit is such that the valves 65 are energized and the motor 67 is caused to drive the driven member 57 still further out of correspondence with the pilot device 58. This incorrect rotation proceeds until the extension 73 engages the switching device 74 causing the latter to disconnect the right hand terminal of the grid transformer 64 from the upper terminal of the transformer 63 and to connect the right hand terminal of the transformer 64 with the lower terminal of the transformer 63. This results in reversing the phase of the voltage applied to the grid circuit of the electric valve apparatus and the valves 66 are energized to supply current to the motor 67 in a direction such that the motor reverses its direction of rotation and drives the driven member 57 in the reverse direction into correspondence with the pilot device 58. As this reverse rotation continues the rotors of the transmitter and receiver become less than 180° out of correspondence at which time the pin 75 has traveled to the upper end of the slot 77 which causes the extension 73 to snap the switch 74 back to the position in which it is illustrated. Since the rotors of the transmitter and receiver are less than 180° out of correspondence the contact 62 is now actuated into engagement with the contact member 70. Thus, the switch 74 retransfers the control of the electric valve apparatus to the transmitter 56, receiver 55 and the cam 61, and the valves 66 continue to supply current to the motor 67 until the driven member 57 is again in correspondence with the pilot device 58 at which time the cam member 61 and the contact member 62 occupy the positions in which they are illustrated, thereby disconnecting the grid circuit of the electric valve apparatus from the transformer 63. As a result the electric valve apparatus is deenergized and the motor 67 is brought to rest with the pilot device 58 and the driven member 57 in correspondence.

If the relative position of the transmitter 58 and the driven member 57 as indicated by the relative positions of the broken line 76 and the extension 73 are reversed the operation will be similar to that already described with the exception that the reversal operation of the motor is provided by engagement of the extension 73 with the switching device 78.

This operation will readily be understood from the detailed description of this particular phase of the operation in connection with the system of Fig. 1 with which it is similar and hence will not be repeated.

Although in accordance with the provisions of the patent statutes, this invention is described as embodied in concrete form, it will be understood that the elements, apparatus and connections shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is,—

1. A follow-up system comprising a pilot device, a driven member, means for driving said driven member, a control circuit for said driving means, means for supplying voltage to said control circuit, and means for reversing the polarity of said voltage if said pilot device and said driven member depart from correspondence by a predetermined amount.

2. A follow-up system comprising a pilot device, a driven member, driving means for said member, a control circuit for said driving means, means for supplying an alternating voltage to said circuit and means for reversing the phase of said voltage if the angular disagreement of said pilot device and driven member exceeds a predetermined amount.

3. A follow-up control system and the like comprising a pilot device, a driven member, driving means for said member, supply means for said driving means comprising electric valve apparatus provided with a control circuit, means for supplying a voltage to said circuit and means for reversing said voltage if the angular disagreement of said pilot device and driven member exceeds a predetermined amount.

4. A follow-up control system and the like comprising a pilot device, a driven member, driving means for said member, supply means for said driving means comprising electric valve apparatus provided with a control grid, means for supplying an alternating voltage to said grid, and means for reversing the phase of said voltage if the angular disagreement of said pilot device and driven member exceeds a predetermined amount.

5. A follow-up control system and the like comprising a pilot device, a driven member, an electric motor for driving said member, supply means for said motor comprising electric valve apparatus provided with a control grid, means for supplying a voltage to said grid, means controlled by said pilot device and driven member for controlling said voltage, means for rendering said voltage controlling means inactive and for applying voltage of reverse polarity to said grids if the angular disagreement of said pilot device and driven member exceeds a predetermined amount, and means providing reactivation of said voltage controlling means when said angular disagreement becomes less than said predetermined amount.

6. A follow-up system and the like comprising a pilot device, a driven member, means for driving said member, a control circuit for controlling said driving means, means for controlling the voltage of said circuit to cause said driving means to drive said member into positional correspondence with said pilot device, driving connections between said voltage controlling means and said pilot device and member such that when the positional disagreement of said pilot device and member exceeds a predetermined amount said voltage causes said motor to drive said member out of correspondence, a member driven by said driving means for rendering said voltage controlling means inactive and supplying a correct voltage to said circuit to cause said driving means to drive said driven member toward correspondence, and a lost motion device providing for reactivation of said voltage controlling means when said positional disagreement is less than said predetermined amount.

7. A follow-up control system and the like comprising a pilot object, a driven object, means for driving said driven object, a control circuit for said driving means, means responsive to positional disagreement of said objects for controlling the voltage of said circuit so as to cause said driving means to drive said driven object into correspondence with said pilot object, said voltage controlling means acting to cause said driving means to drive said driven object out of correspondence if said positional disagreement exceeds a predetermined amount, a member driven by said driving means for rendering said voltage controlling means inactive and applying a voltage of correct polarity to said circuit if said positional disagreement exceeds a predetermined amount, and a lost motion device included in the connections between said member and said driving means providing for reenergization of said voltage controlling means when positional disagreement becomes less than said predetermined amount.

8. A follow-up control system comprising a driven object, a pilot object, an electric motor for driving said driven object, supply means for said motor comprising electric valve apparatus provided with a control grid, means comprising inductive devices responsive to positional disagreement of said objects for supplying a control voltage to said grid, additional normally inactive means for supplying a control voltage to said grid, switching means for selectively connecting said grid with said inductive devices and said additional means, a member driven in accordance with the movement of said driven object for actuating said switching means to render said inductive devices temporarily inactive and for connecting said grid with said additional means if the positional disagreement of said objects exceeds a predetermined amount so that said motor is controlled to drive said driven object into correspondence, and a pin and slot connection between said member and its driving means providing for reactivation of said inductive device when said positional disagreement is less than said predetermined amount.

9. A follow-up control system and the like comprising a pilot object, a driven object, an electric motor for driving said driven object, an electric valve for supplying current to said motor for rotation in one direction, a second valve for supplying current for opposite rotation, said valves being provided with control grids, a pair of rotary induction devices each having a pair of relatively movable winding elements, electrical connections between a winding of one of said devices and a winding of the other device and electrical connections between one of said windings and said grids, driving connections between a winding of said devices and one of said objects whereby a voltage proportional to the positional disagreement of said objects is applied to the grids of said valves to control said motor to drive said driven object into correspondence and whereby if said positional disagreement exceeds a predetermined amount one of said valves is energized and said objects are driven out of agreement, an additional normally inactive transformer for supplying a voltage to said grids, switching means for selectively connecting said induction devices and said transformer with said grids, a member driven in accordance with the movement of said driven object for actuating said switching means to connect said transformer with said grids so that the other of said valves is energized to cause said motor to drive said driven object into correspondence, and a lost motion device comprising a pin and slot connection between said member and its driving means for returning the control to said inductive devices when said disagreement becomes less than said predetermined amount.

10. A follow-up system and the like comprising a pilot device, a driven object, an electric motor for driving said driven object, a control circuit for controlling the operation of said motor, a switching device for controlling the voltage of said circuit to control the direction of said motor, means responsive to positional disagreement of said pilot device and driven object and a heart-shaped cam actuated by said means for actuating said switching device, means for rendering said cam and switching device inactive if said positional disagreement exceeds a predetermined amount and for reversing the polarity of said voltage, and means for reactivating said cam and switching device when said disagreement becomes less than said amount.

11. A follow-up control system and the like comprising a pilot device, a driven object, an electric motor for driving said driven object, supply means for said motor comprising electric valve apparatus provided with a control grid circuit, switching means for controlling the voltage of said grid means responsive to positional disagreement of said pilot device and driven object and a heart-shaped cam actuated thereby for actuating said switching means, means for taking the control from said cam and switching means if said disagreement exceeds a predetermined amount and for controlling said valve apparatus so that the direction of rotation of said motor is reversed and means providing for returning the control to said cam and switching means when said disagreement becomes less than said amount.

12. A follow-up system and the like comprising a pilot object, a driven object, an electric motor for driving said driven object, supply means for said motor comprising electric valve apparatus provided with a control grid circuit, a source for supplying voltage to said grid circuit, a switching device for controlling said voltage to control the direction of rotation of said motor, an electrical motion transmitting system comprising a transmitting device connected to said pilot device and a receiving device connected to said transmitting device and to said driven object, a heart-shaped cam actuated by said receiving device for controlling said switching device, a member driven in accordance with the movement of said driven object and an additional switching device driven thereby for temporarily taking the control from said cam and first switching device if said disagreement exceeds a predetermined amount and for controlling the voltage of said circuit so that said motor drives said driven object toward correspondence with said pilot object, and a lost motion device actuated by said member for returning the control to said cam and first switching device when said disagreement becomes less than said predetermined amount.

ALBERT H. MITTAG.